US012444564B2

(12) United States Patent
Douglass

(10) Patent No.: US 12,444,564 B2
(45) Date of Patent: Oct. 14, 2025

(54) GLASS RODS FUSE ASSEMBLY AND METHODS OF MANUFACTURE

(71) Applicant: Eaton Intelligent Power Limited, Dublin (IE)

(72) Inventor: Robert S. Douglass, Wildwood, MO (US)

(73) Assignee: Eaton Intelligent Power Limited, Dublin (IE)

( * ) Notice: Subject to any disclaimer, the term of this patent is extended or adjusted under 35 U.S.C. 154(b) by 111 days.

(21) Appl. No.: 18/188,245

(22) Filed: Mar. 22, 2023

(65) Prior Publication Data

US 2024/0321541 A1 Sep. 26, 2024

(51) Int. Cl.
*H01H 85/165* (2006.01)
*H01H 85/06* (2006.01)
*H01H 85/18* (2006.01)

(52) U.S. Cl.
CPC .......... *H01H 85/06* (2013.01); *H01H 85/165* (2013.01); *H01H 85/185* (2013.01)

(58) Field of Classification Search
CPC ..................... H01H 85/06; H01H 85/165–185
See application file for complete search history.

(56) References Cited

U.S. PATENT DOCUMENTS 3,848,214 A * 11/1974 Salzer .................. H01H 85/042 337/252
4,099,153 A * 7/1978 Cameron ............... H01H 85/42 337/159
4,166,266 A * 8/1979 Kozacka .............. H01H 85/185 337/276
4,183,004 A * 1/1980 Kozacka .............. H01H 85/185 337/279
4,306,212 A * 12/1981 Belcher ................ H01H 85/303 337/267
5,892,427 A * 4/1999 Handcock .............. H01H 85/12 337/229

* cited by examiner

*Primary Examiner* — Jacob R Crum
(74) *Attorney, Agent, or Firm* — Baker Botts L.L.P.

(57) ABSTRACT

Embodiments of the present disclosure provide medium or high voltage fuses that employ spiral wound elements supported by rods, which may replace the usages of a ceramic core. In particular, the use of rods to wind and fix spiral fuse elements provides increased reliability by minimizing the fuse elements from drifting within the fuse assembly.

17 Claims, 8 Drawing Sheets

100

GLASS RODS FUSE ASSEMBLY AND METHODS OF MANUFACTURE

TECHNICAL FIELD

This disclosure generally relates to a medium voltage fuse assembly and methods of manufacture, and more specifically to the manufacture of medium voltage fuse assembly employing glass rod winding fixtures and spiral wound elements.

BACKGROUND

Medium and high-voltage fuses are typically constructed with long fuse elements that are configured by linear accordion-shaped bends or helical spiral forms. Fuse elements that are configured in the helical form are typically wound on a star- or spider-shaped ceramic core. Additional fuse elements may be configured in parallel by placing the elements at angular intervals about the core diameter, limited by the spacing requirements for separating arcs along and between the fuse elements. When even more fuse elements are needed, an outer winding of elements can be incorporated at a greater diameter of the first core windings. However, the outer winding of elements is difficult to incorporate because the outer windings must be separated a certain distance from the inner winding. Conventional techniques typically place removable fixtures within the fuse assembly, wind the fuse elements onto the fixtures, fill the fuse assembly with compacted sand, and then remove the fixtures from the fuse assembly. Such conventional techniques face issues of maintaining the outer winding of fuse elements symmetrically spaced apart from the inner winding of fuse elements, for example, because the sand filler can drift and move within the fuse assembly due to dimensional influences over time from thermal cycling and shock and vibration. Over time the outer elements can also drift and move resulting in the outer elements being positioned either too close to the inside wall of the fuse tube or too close to adjacent parallel elements. In such conditions, the fuse may become hazardous and risk the safety of those relying on the fuse.

Thus, there is a need for an improved arrangement of fuse elements in a fuse assembly that can eliminate the drifting of the fuse elements. Also, there is a need to cost cut and reduce the total materials for manufacturing the fuse assembly.

The background description provided herein is for the purpose of generally presenting the context of the disclosure. Work of the present named inventors, to the extent it is described in this background section, as well as aspects of the description that may not otherwise qualify as prior art at the time of filing, are neither expressly nor impliedly admitted as prior art against the present disclosure.

SUMMARY OF PARTICULAR EMBODIMENTS

Embodiments of the present disclosure provide a medium and/or high voltage fuse employing spiral wound elements and glass rod winding fixtures. In particular, embodiments provide a fuse assembly with a plurality of glass rods. Each glass rod may be elongated, and each end of each glass rod may be coupled to an end plate. For example, a first end of each glass rod may be coupled to a first end plate, and a second end of each glass rod may be coupled to a second end plate. In an embodiment, each end of each glass rod may be coupled to the respective end plate through a plurality of anchor points, where each anchor point may be configured to couple an end of each glass rod. Such a way of coupling each end of each glass rod with one anchor point positions each glass rod of the plurality of glass rods detached from other glass rods and radially spaced from each of the other glass rods. In an embodiment, the plurality of glass rods may be wound by a fuse element in a helical fashion. In an embodiment, the plurality of glass rods together may be wound by a plurality of fuse elements where each fuse element may be parallel to another fuse element. Each end of the fuse element may be conductively coupled to the first end plate and the second end plate, respectively.

Embodiments of the present disclosure provide a fuse assembly having a first set of a plurality of glass rods corresponding to an outer portion of the fuse assembly and a second set of a plurality of glass rods corresponding to an inner portion of the fuse assembly. Each glass rod in the first set may be detached and radially spaced from the other glass rods. Each glass rod in the second set may be detached and radially spaced from other glass rods of the second set. In an embodiment, end plates may be configured with anchor points to which glass rods can be secured to. Fuse elements may be wound around the glass rods, respectively to the inner and outer portions. The fuse elements may be conductively coupled to the end plates. In an embodiment, one or more rod support spacers may be configured between, for example, the glass rods corresponding to the inner portion to support the radial structure of the glass rods. In an embodiment, the fuse assembly may be encased in a housing or a casing that may be filled with compact fuse fillers. The fuse elements may be wound around the rods, and the rods may provide structural support to the fuse elements. The fuse assembly may be filled with arc quenching sand fillers, which may provide further structural support to the fuse elements.

The embodiments disclosed herein are only examples, and the scope of this disclosure is not limited to them. Particular embodiments may include all, some, or none of the components, elements, features, functions, operations, or steps of the embodiments disclosed herein. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims. Additional objects and advantages will be set forth in part in the description which follows, and in part will be obvious from the description, or may be learned by practice of the disclosure. The objects and advantages will also be realized and attained by means of the elements and combinations particularly pointed out in the appended claims. It is to be understood that both the foregoing general description and the following detailed description are exemplary and explanatory only and are not restrictive of the claimed invention.

BRIEF DESCRIPTION OF THE DRAWINGS

Non-limiting and non-exhaustive embodiments are described with reference to the following Figures, wherein like reference numerals refer to like parts throughout the various drawings unless otherwise specified.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Figure 1:
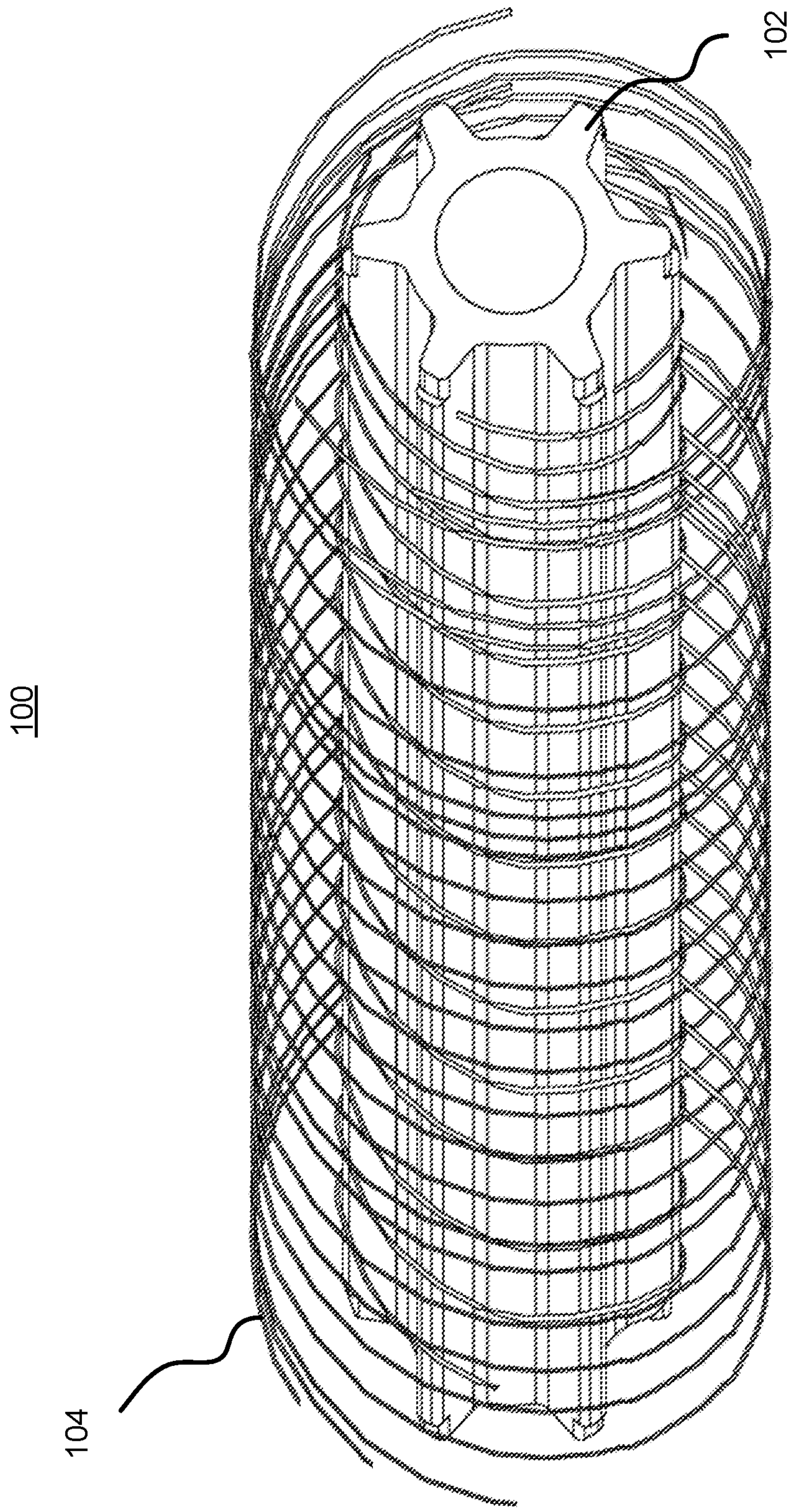
FIG. 1 illustrates an example of a fuse assembly with two sets of windings.
Figure 2:
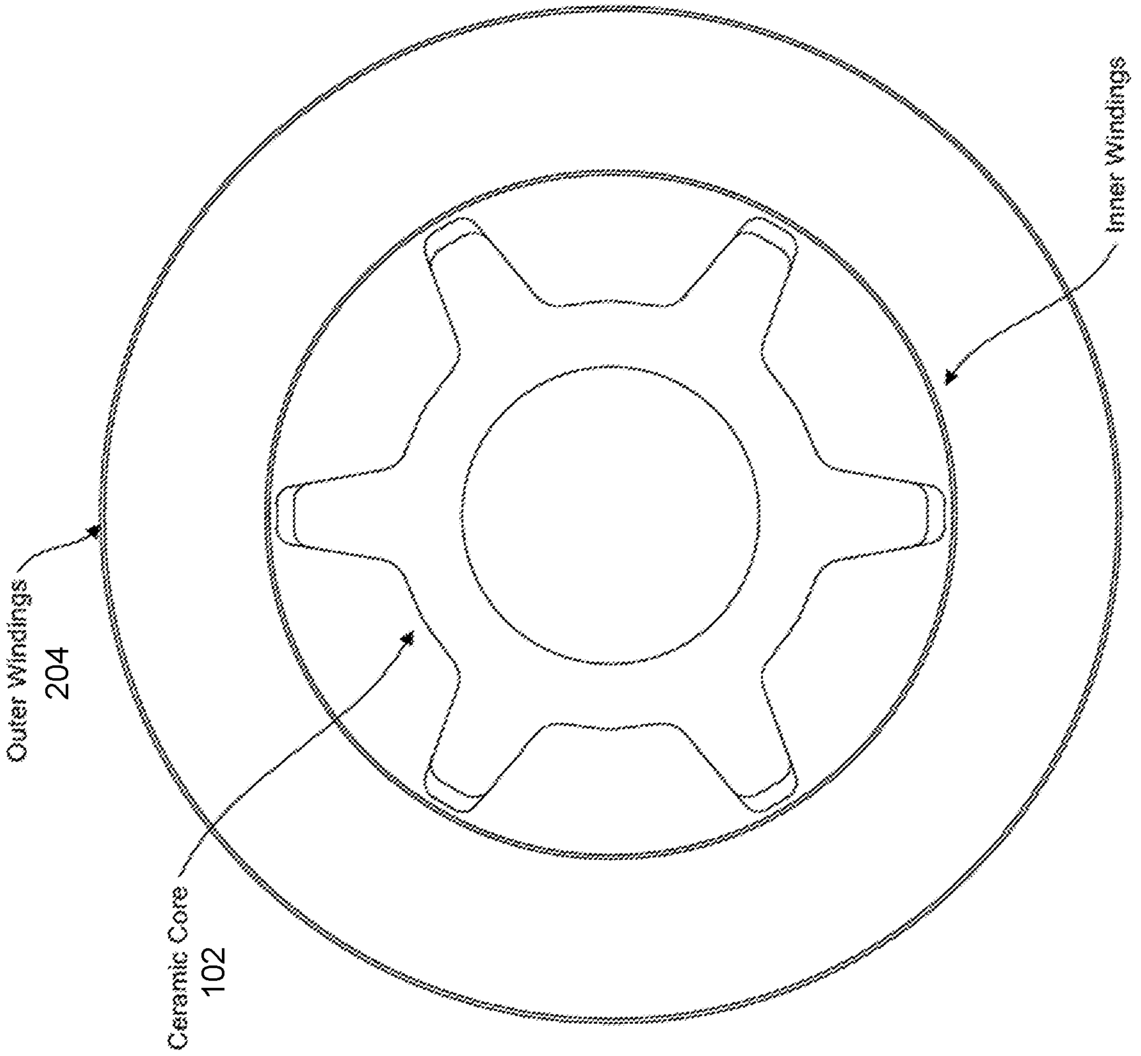
FIG. 2 illustrates a front view of an exemplary fuse assembly.
Figure 3:
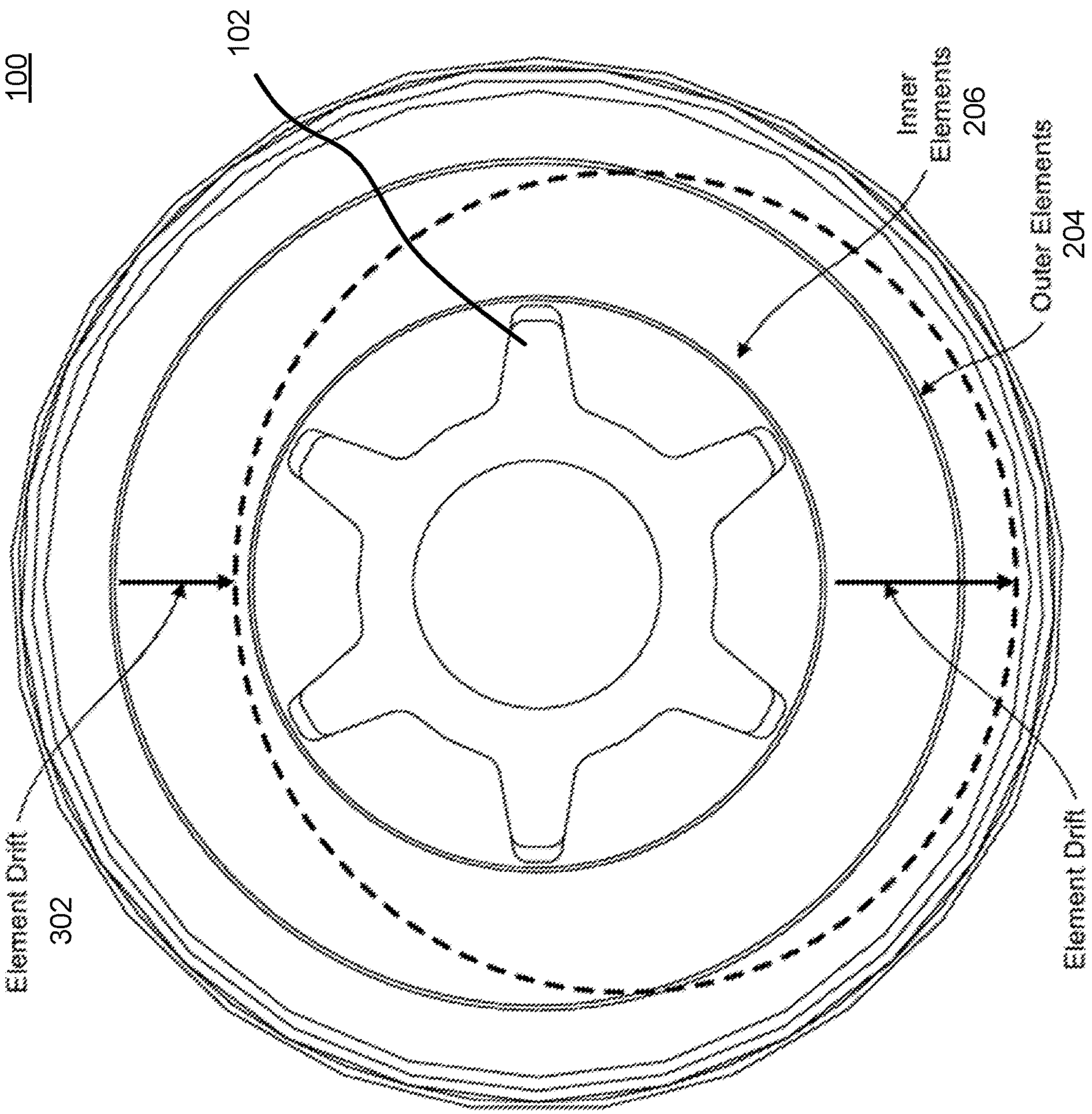
FIG. 3 illustrates another front view of an exemplary fuse assembly.

FIGS. 1-3 provide illustrations of an exemplary fuse assembly that are intended to provide the context of the disclosure. No aspect of the descriptions corresponding to FIGS. 1-3 is intended to qualify as prior art at the time of filing, and is neither expressly nor impliedly admitted as prior art against the present disclosure.

FIG. 1 illustrates a fuse assembly 100 with a ceramic core 102 and fuse element 104 wound around the ceramic core 102. The fuse assembly 100 may be configured to operate in medium or high-voltage situations. In one example, a fuse element 104 may be wound around the ceramic core 102. In particular, referring to FIG. 1, the ceramic core 102 of the fuse assembly 100 may be a star or spider-shaped ceramic core 102. The fuse element 104 may be wound around the ceramic core 102 by linear accordion-shaped bends or by helical spiral form. In an embodiment, more than one fuse element may be wound around the ceramic core, each fuse element placed in parallel with another and placed at angular intervals about the core diameter of the ceramic core 102. The number of fuse elements incorporated into the fuse assembly may be limited by the space available around the ceramic core 102 to allow sufficient separating of arcs along and between other fuse elements.

FIG. 2 illustrates a front view of the ceramic core 102 with two sets of windings. As noted above, more than one fuse element may be wound around the core of a fuse assembly, for example, placed in parallel with one another and at angular intervals about the core diameter of the ceramic core. Examples of such fuse elements are shown in FIG. 2 as the inner windings 206. When the maximum number of fuse elements are incorporated at a particular distance from the core (e.g., inner windings 206), additional fuse elements may be incorporated into the fuse assembly at a different distance from the core (e.g., outer windings 204). Typically, the outer windings 204 may be suspended on nothing but an arc quenching filler, such as compacted sand. However, fuse elements suspended on such sand fillers may be susceptible to drifting within the fuse assembly due to, for example, dimensional influences over time from thermal cycling, shock, and vibration. The drifting of the fuse elements may worsen over time, and thereby create dangerous fuse operating conditions.

FIG. 3 illustrates the drifting of the fuse elements corresponding to the outer windings 204 (or outer elements 204). The drifting issue may cause the outer elements 204 to be positioned too closely with other fuse elements, e.g., the inner windings 206 (or inner elements 206). When fuse elements are positioned too close to each other, there is an increased risk of undesirable arc events. In particular embodiments, to reduce the drifting of the fuse elements 104 and the cost of manufacturing the fuse assembly 100, a rod support system may be used to secure the fuse elements within the fuse assembly.

Figure 4:
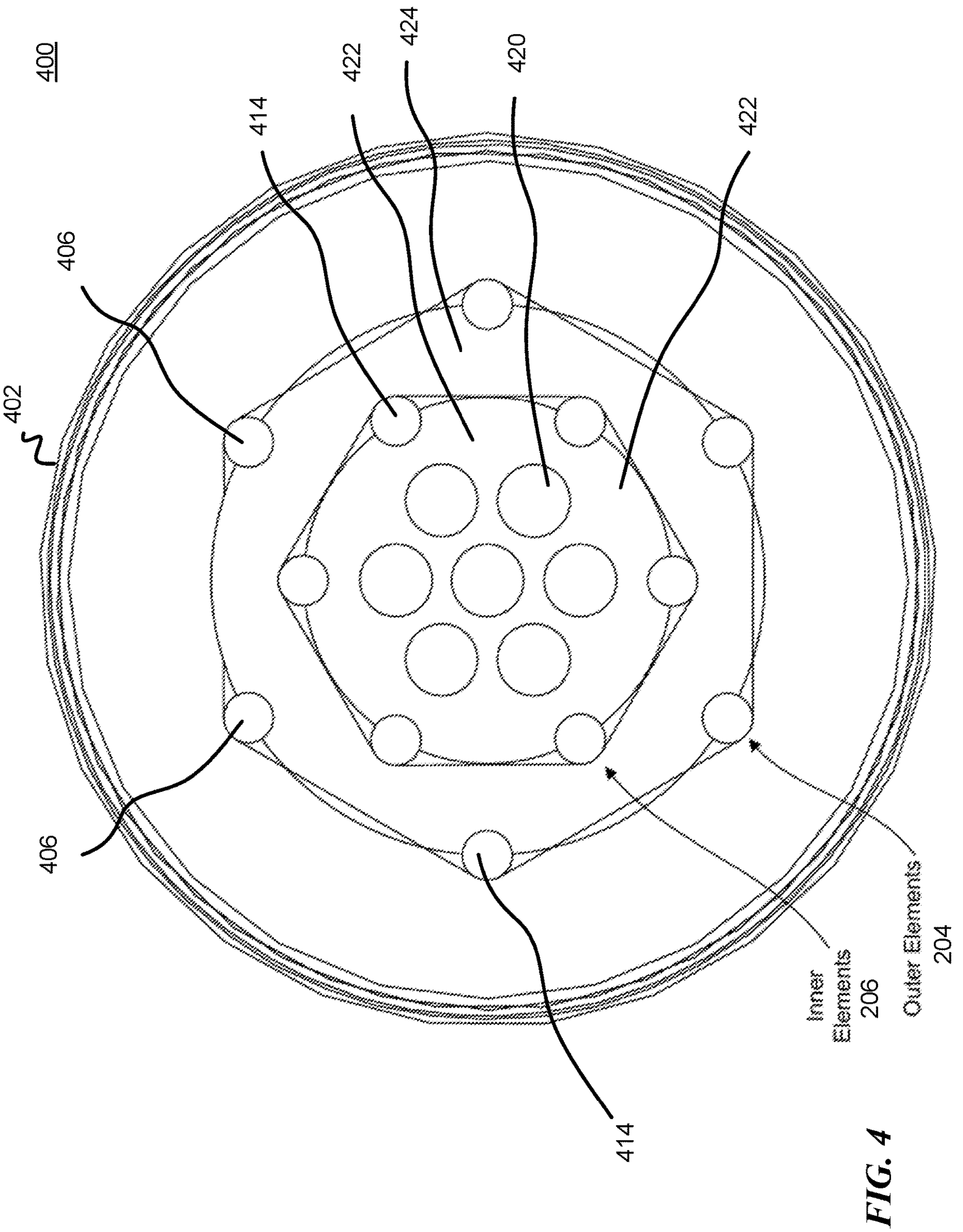
FIG. 4 illustrates exemplary fuse assembly with a rod support system.
Figure 5:
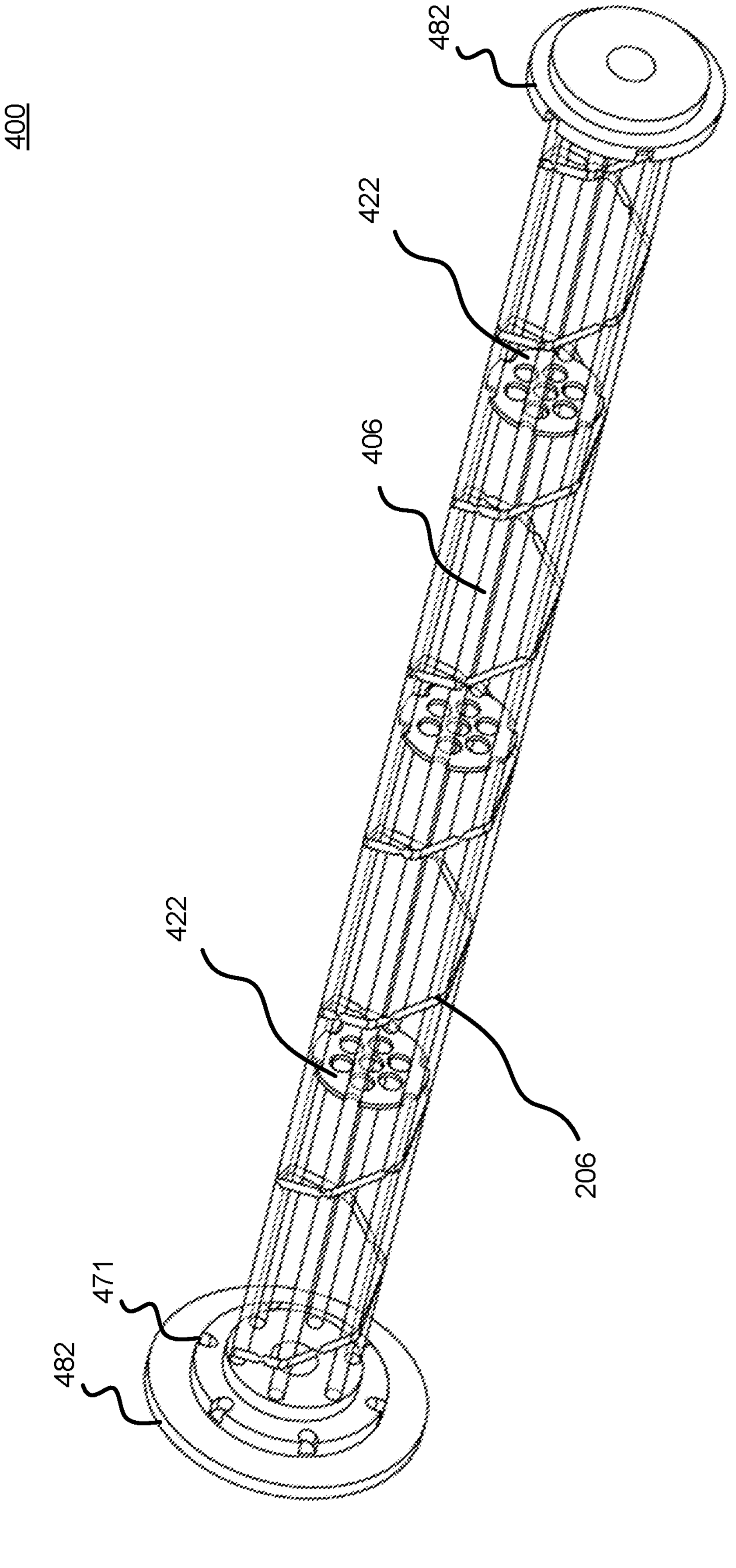
FIG. 5 illustrates another exemplary fuse assembly showing the inner rods.
Figure 6:
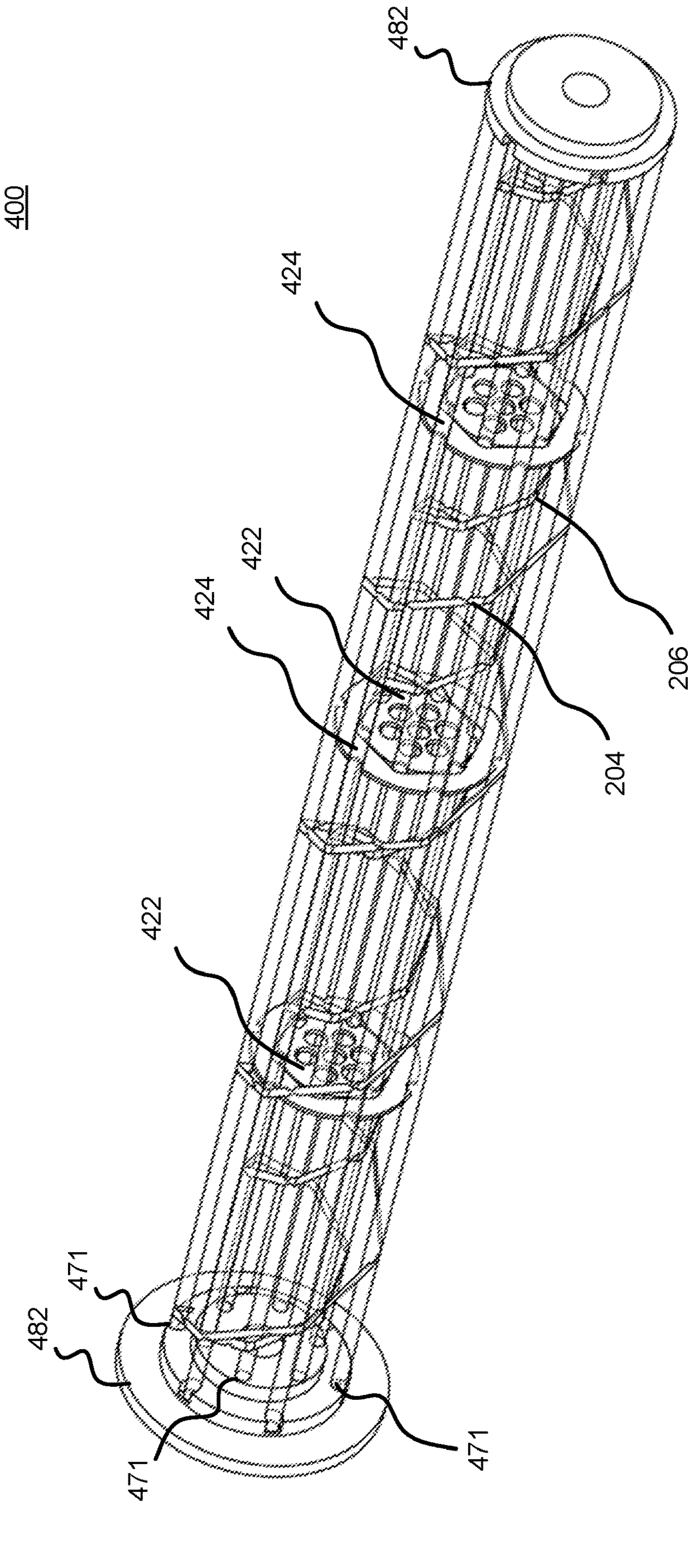
FIG. 6 illustrates another exemplary fuse assembly showing the inner rods and the outer rods.

FIG. 4 illustrates a fuse assembly 400 with a rod support system. A fuse 400 may comprise two sets of rods, a first set of rods 414 corresponding to the inner portion of the fuse 400 and a second set of rods 406 corresponding to the outer portion of the fuse 400. FIG. 5 illustrates another view of the fuse assembly 400 showing just the inner rods 414. FIG. 6 illustrates another view of the fuse assembly 400 showing both the inner rods 414 and the outer rods 406. For each set of the rods, the rods may be configured at a particular distance away from the center and radially spaced from each of the other rods in the set. An example of such an arrangement is shown in FIG. 4, where the inner rods 414 are shown at a closer distance from the center, relative to the outer rods 406. FIG. 4 further illustrates the rods being radially spaced from each of the other rods in the set. In an embodiment, the rods may be cylindrical-shaped glass rods. In other embodiments, different shapes of rods may be used, such as a prism with n-number of faces. The rods may also be made of a material different than glass, for example, non-conductive materials such as paper, glass, rubber, porcelain, ceramic, or plastic.

In an embodiment, one or more rods in the outer portion and/or the inner portion may be configured with an inner chamber. The inner chamber in the rod may be filled with an arc-quenching filler. The arc-quenching filler acts as an arc-quenching medium, examples of which include quartz silica sand and liquid sodium silicate binder. The arc-quenching liquid in the inner chamber of the rods provides improved performance by reducing the impact of arc events.

In an embodiment, a fuse assembly 400 may be configured with one or more rod support spacers 422. For example, FIG. 5 illustrates rod spacers 422 is configured to fit between the rods 406. The rod support spacers provide structural support to the rods. In an embodiment, the rod spacers 422 may be configured with one or more holes 420 through which filler material can flow through, e.g., such as when filler material is poured into the fuse assembly 400. Additional details of the filler material are discussed above. In an embodiment, the rod spacers 422 may comprise another portion that is used to support the outer rods 406, e.g., outer rod spacers 424 shown in FIGS. 4 and 6. In an embodiment, the rod spacers 422 and the outer rod spacer 424 may be manufactured in one piece, or alternatively, the rod spacers 422 and the outer rod spacers 424 may be manufactured to be their own separate pieces. In embodiments where the rod spacers 422 and 424 are manufactured to be their own separate pieces, the rod spacers 422 and 424 may be combined with each other using adhesives before fitting them between the rods, or alternatively after fitting them between the rods. In an embodiment, rod spacers 422 and 424 may be configured with indents or holes matching the shape of the rods (or a portion of the rods), such that the rods can be secured to the indents/holes in a fixed manner, which minimizes undesired movement.

In an embodiment, fuse elements may be wound around the rods. For example, in FIG. 5, a fuse element 414 corresponding to the inner windings 206 is shown as being wound around the inner rods 406. In FIG. 6, a fuse element 406 corresponding to the outer windings 204 is shown as being wound around the outer rods 424. As shown in the figures, the fuse elements may be wound around the rods in a helical fashion or spiral form. FIGS. 5 and 6 have been illustrated with the reduced number of fuse elements as simplified variations of the embodiments herein, but in practice, additional fuse elements may be incorporated into the fuse assembly. The simplified illustrations are not intended to be limiting in any way.

In particular embodiments, the rods may be configured to be placed between two end plates 482. In an embodiment, the end plates may be metal plates that are welded or soldered in place. In other embodiments, the end plates may be made of any other conductive material suitable for fuse operations.

In an embodiment, a fuse assembly 400 may be configured with anchor points to which rods may be secured to. For example, FIG. 6 illustrates end plates 482 that are configured with anchor points 471 to which rods may be secured. In an embodiment, an anchor point 471 may be a slot, a hole, openings, through-cut, round holes, square grooves, or any other shaped cavity configured to fit the ends of the rods. In an embodiment, the rods that are placed on the anchor point 471 may further be secured by the use of adhesives or other mechanical means.

Figure 7:
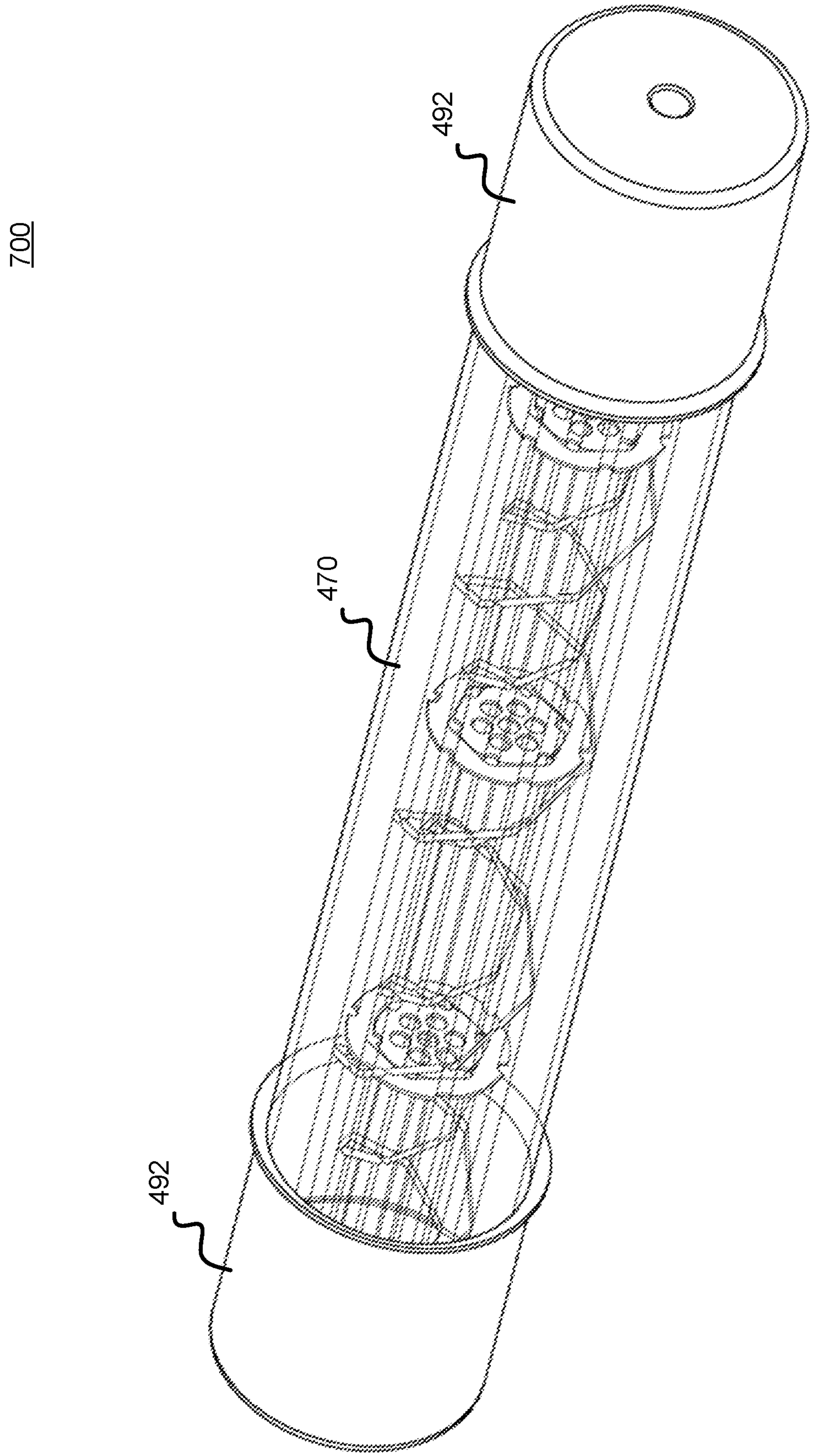
FIG. 7 illustrates another exemplary fuse assembly with a casing that encloses the fuse assembly components.

FIG. 7 illustrates another view of the fuse assembly 400 with a casing that encloses the fuse assembly components. In an exemplary embodiment, the casing 470 may be a transparent tube that may be a glass epoxy composite material to encase the fuse assembly 400. In an embodiment, a fuse assembly 400 may be fitted with an end cap cover, such as element 492 shown in FIG. 7. The entirety or a portion of the end cap covers 492 may be made of conductive material that is conductively coupled with the end plates 482 shown in FIG. 6. For example, the end cap covers 492 may be conductively coupled to the end plates 482 using pins, snaps, or screws, or alternatively using adhesives to attach the end plates to the end cap covers, while still using a conductive material to allow the flow of electrical current.

In an embodiment, a fuse assembly 400 may be filled with an arc quenching filler (e.g., compacted sand). In an embodiment, the fuse assembly 400 may be filled with the filler material before the end plates 482 and/or the end cap covers 492 are fitted to the fuse assembly 400. In some embodiments, the end plates 482 may be configured with holes through which the filler material may be inserted into. As discussed previously, the rod spacers may be configured with one or more holes 420, as shown in FIG. 4, to allow the filler material to flow through. The filler material that has been compacted in the fuse assembly 400 may serve an arc quenching role by minimizing arc events, as well as serving a thermal management role. The compacted filler material may further provide structural support to the components included in the fuse assembly by reducing the movements thereof.

Figure 8:
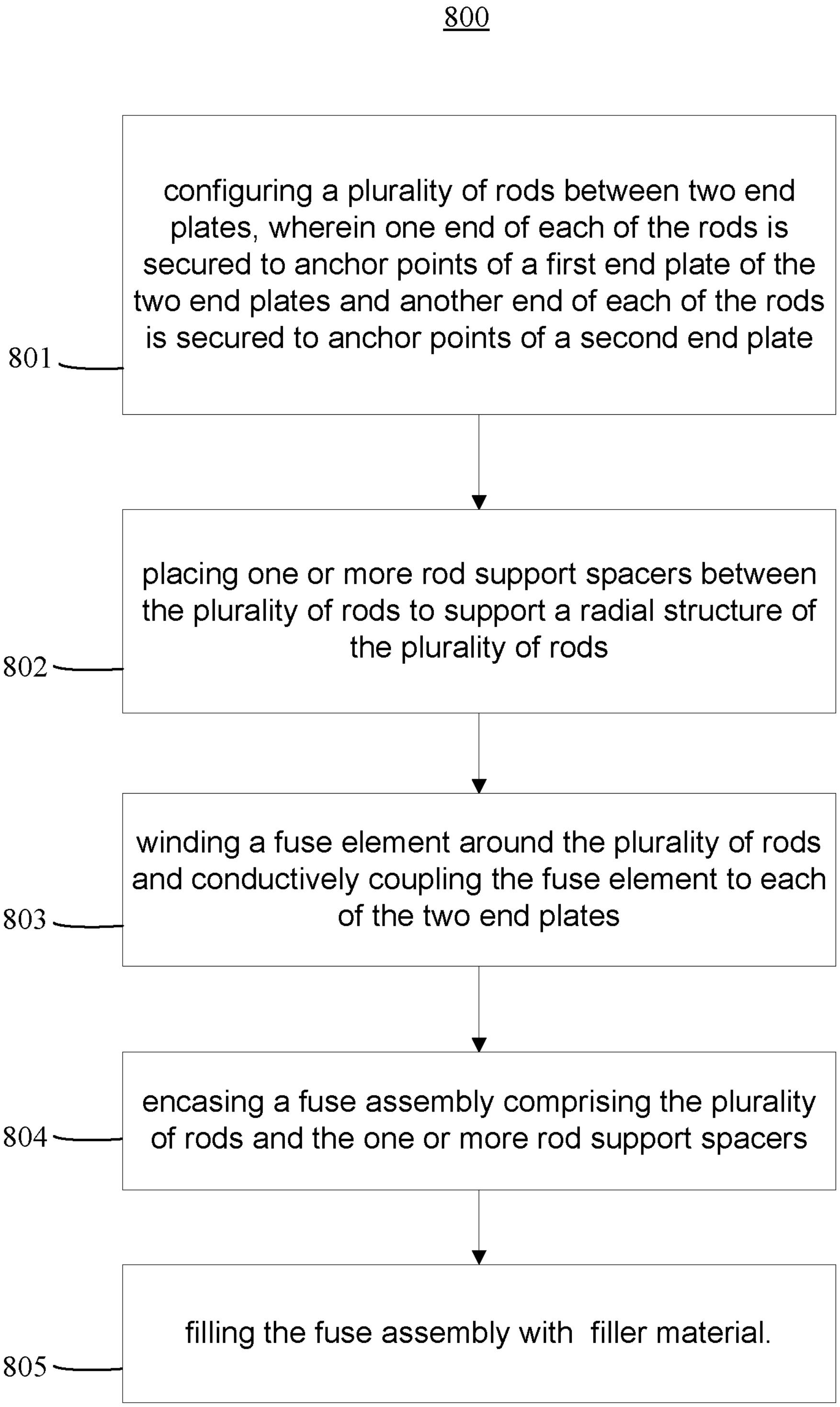
FIG. 8 illustrates exemplary steps of manufacturing a fuse assembly.

FIG. 8 illustrates exemplary steps of manufacturing 800 of the fuse assembly 400 that may correspond to medium or high voltage fuses employing spiral wound elements. The method may begin at step 801 by configuring a plurality of rods between two end plates, wherein one end of each of the rods is secured to anchor points of a first end plate of the two end plates and another end of each of the rods are secured to anchor points of a second end plate. In an embodiment, one or more rods may be configured with an inner chamber. The inner chamber in the rod may be filled with an arc-quenching filler. The rods may be configured to release the arc-quenching filler during an arc event, thereby reducing the impact of an arc event. The method may continue at step 802 by placing one or more rod support spacers between the plurality of rods to support a radial structure of the plurality of rods. The method may continue at step 803 by winding a fuse element around the plurality of rods and conductively coupling the fuse element to each of the two end plates. The method may continue at step 804 by encasing a fuse assembly comprising the plurality of rods and the one or more rod support spacers. The method may continue at step 805 by filling the fuse assembly with filler material. Particular embodiments may repeat one or more steps of the method of FIG. 8, where appropriate. Although this disclosure describes and illustrates particular steps of the method of FIG. 8 as occurring in a particular order, this disclosure contemplates any suitable steps of the method of FIG. 8 occurring in any suitable order. Moreover, although FIG. 8 describes an example method for manufacturing the fuse assembly, this disclosure contemplates any suitable method for manufacturing the fuse assembly, which may include all, some, or none of the steps of the method of FIG. 8, including any of the descriptions of the fuse assembly 400 with reference to FIGS. 1, 2, 3, 4, 5, 6, and 7.

Embodiments of the present disclosure provide medium or high voltage fuses that employ spiral wound elements supported by rods, which may replace the usages of a ceramic core. In particular, the use of rods to wind and fix spiral fuse elements provides increased reliability by minimizing the fuse elements from drifting within the fuse assembly.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A fuse assembly comprising:

two end plates;

a plurality of rods coupled to the two end plates, wherein, for each of the plurality of rods, a first end of the rod is coupled to a first end plate of the two end plates and a second end of the rod is coupled to a second end plate of the two end plates, wherein each of the plurality of rods is detached and spaced from each of the other rods, and wherein the plurality of rods includes a first set of rods configured in an outer portion of the fuse assembly and a second set of rods configured in an inner portion of the fuse assembly;

one or more rod support spacers configured to support a radial structure of the plurality of rods, wherein the one or more rod support spacers are configured to support the first set of rods and the second set of rods; and a first fuse element and a second fuse element each conductively coupled to the two end plates, wherein the first fuse element is wound around the first set of rods in a helical fashion, and wherein the second fuse element is wound around the second set of rods in a helical fashion.

2. The fuse assembly of claim 1, wherein one or more rods of the first set of rods or the second set of rods comprises an inner chamber filled with an arc-quenching filler.

3. The fuse assembly of claim 1, wherein the one or more rod support spacers are further configured with holes to allow fuse filler material to flow through the fuse assembly.

4. The fuse assembly of claim 1, wherein the fuse assembly is encased in a casing.

5. The fuse assembly of claim 4, wherein the casing of the fuse assembly is filled with a fuse filler material.

6. A method of manufacturing a fuse assembly, the method comprising:

configuring each of two end plates with a plurality of anchor points;

positioning a plurality of rods between the two end plates, wherein, for each of the plurality of rods, a first end of the rod is coupled to one of the anchor points of a first end plate of the two end plates and a second end of the rod is coupled to another of the anchor points of a second end plate of the two end plates, wherein each of the plurality of rods is detached and spaced from each of the other rods, and wherein the plurality of rods includes a first set of rods configured in an outer portion of the fuse assembly and a second set of rods configured in an inner portion of the fuse assembly;

positioning one or more rod support spacers within the fuse assembly to support a radial structure of the plurality of rods, wherein the one or more rod support spacers are configured to support the first set of rods and the second set of rods; and winding a first fuse element around the first set of rods in a helical fashion and a second fuse element around the second set of rods in a helical fashion, wherein the first fuse element and the second fuse element each is conductively coupled to the two end plates.

7. The method of manufacturing of claim 6, wherein the plurality of anchor points includes a first set of anchor points configured in the outer portion of the fuse assembly and a second set of anchor points configured in the inner portion of the fuse assembly.

8. The method of manufacturing of claim 6, wherein one or more rods of the first set of rods or the second set of rods comprises an inner chamber filled with an arc-quenching filler.

9. The method of manufacturing of claim 6, wherein the one or more rod support spacers are configured with holes.

10. The method of manufacturing of claim 6, wherein the method further comprises:

encasing the fuse assembly within a casing.

11. The method of manufacturing of claim 10, wherein the method further comprises:

filling the casing of the fuse assembly with fuse filler material.

12. The fuse assembly of claim 1, wherein the one or more rod support spacers comprise a first set of holes for accommodating the first set of rods and a second set of holes for accommodating the second set of rods.

13. The fuse assembly of claim 1, wherein the one or more rod support spacers comprise a first rod support spacer configured to support the first set of rods and a second rod support spacer configured to support the second set of rods.

14. The fuse assembly of claim 13, wherein the first rod support spacer and the second rod support spacer are manufactured as a single piece.

15. The fuse assembly of claim 13, wherein the first rod support spacer and the second rod support spacer are manufactured as separate pieces.

16. The fuse assembly of claim 1, wherein each rod of the first set of rods and the second set of rods is made of non-conductive material.

17. The fuse assembly of claim 1, wherein each rod of the first set of rods and the second set of rods is made of glass.

* * * * *